United States Patent
Levchenko et al.

(10) Patent No.: US 9,043,907 B1
(45) Date of Patent: May 26, 2015

(54) SYSTEM AND METHODS FOR CONTROL OF APPLICATIONS USING PRELIMINARY FILE FILTERING

(71) Applicant: Kaspersky Lab ZAO, Moscow (RU)

(72) Inventors: Vyacheslav I. Levchenko, St. Petersburg (RU); Maxim V. Yudin, St. Petersburg (RU); Pavel L. Polozov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/300,878

(22) Filed: Jun. 10, 2014

(30) Foreign Application Priority Data

Apr. 18, 2014 (RU) .............................. 2014115460

(51) Int. Cl.
| G06F 11/00 | (2006.01) |
|---|---|
| G06F 21/56 | (2013.01) |
| G06F 17/30 | (2006.01) |
| H04L 29/06 | (2006.01) |

(52) U.S. Cl.
CPC ........ *G06F 21/564* (2013.01); *G06F 17/30091* (2013.01); *H04L 63/0218* (2013.01); *H04L 63/123* (2013.01); *H04L 63/145* (2013.01); *G06F 21/563* (2013.01); *G06F 21/56* (2013.01)

(58) Field of Classification Search
None
See application file for complete search history.

(56) References Cited

U.S. PATENT DOCUMENTS

| 6,584,061 | B2 * | 6/2003 | Yanagisawa et al. .... 369/112.17 |
| 7,523,500 | B1 | 4/2009 | Szor et al. |
| 7,779,425 | B2 * | 8/2010 | Pudipeddi et al. ............ 719/321 |
| 7,860,850 | B2 | 12/2010 | Park |
| 7,908,656 | B1 * | 3/2011 | Mu .................................. 726/22 |
| 8,015,411 | B2 * | 9/2011 | Zhao .............................. 713/176 |
| 8,042,185 | B1 * | 10/2011 | Mu et al. .......................... 726/24 |
| 8,499,350 | B1 * | 7/2013 | Satish .............................. 726/24 |
| 8,950,007 | B1 * | 2/2015 | Teal et al. ........................ 726/30 |
| 2005/0076041 | A1 * | 4/2005 | Stakutis et al. ............... 707/100 |
| 2005/0086501 | A1 * | 4/2005 | Woo et al. ..................... 713/189 |
| 2005/0273708 | A1 | 12/2005 | Motyka et al. |
| 2006/0069692 | A1 | 3/2006 | Pernia |
| 2008/0109906 | A1 * | 5/2008 | Sallam ............................ 726/24 |
| 2010/0023810 | A1 * | 1/2010 | Stolfo et al. .................... 714/38 |
| 2010/0043070 | A1 | 2/2010 | Okada et al. |
| 2010/0122313 | A1 * | 5/2010 | Ivgi .................................. 726/1 |
| 2013/0312095 | A1 * | 11/2013 | Edwards et al. ................ 726/23 |

\* cited by examiner

*Primary Examiner* — Jaosn K. Gee
*Assistant Examiner* — Olanrewaju Bucknor
(74) *Attorney, Agent, or Firm* — Arent Fox LLP; Michael Fainberg

(57) ABSTRACT

Disclosed are systems, methods and computer program products for control of applications using preliminary file filtering. An example method includes intercepting, by a processor, an operation on a file performed by an application; selecting at least a part of the file; applying one or more file filters to the selected part of the file; determining a set of file characteristics based on outcomes of the file filters; determining a decision, based on the set of file characteristics, whether to exclude the file from further analysis by a client of an application control system; and based on the decision, excluding the file from the further analysis by the client of the application control system or providing the file to the client of the application control system for further analysis whether to allow or prohibit the operation on the file.

15 Claims, 3 Drawing Sheets

# SYSTEM AND METHODS FOR CONTROL OF APPLICATIONS USING PRELIMINARY FILE FILTERING

CROSS-REFERENCE TO RELATED APPLICATIONS

The present disclosure claims benefit of priority under 35 U.S.C. 119(a)-(d) to a Russian Application No. 2014115460 filed on Apr. 18, 2014, which is incorporated by reference herein.

TECHNICAL FIELD

The present disclosure relates generally to the filed of application control, and more specifically, to systems and methods for control of applications using preliminary file filtering.

BACKGROUND

At present, the number of possible software applications used on computing devices, including personal computers, is growing tremendously. Among the many applications is a group of malicious programs that are able to inflict harm on the computer or its user, such as network worms, keyloggers, and computer viruses.

The problem of protecting a group of computers is especially serious for the administrators of computer networks, where a large number of applications is installed on each computer of the network, some of which might be harmful. To solve this problem, one of the common approaches is to use application control systems, where the network administrator has access to the applications executed on the computers in the network using a set of centralized control modules and a group of clients deployed on the computers that can execute commands received from the centralized control module. With such a system, the network administrator is able to create rules that allow or prohibit execution of applications on the computers of the network, and also check the access of these applications to the resources of the computers in the network.

However, the aforementioned approach has one drawback. Analysis by the client of each file being launched on the computer in the network unduly burdens computing resources, such as the processor or hard disk, of the computers in the network. To solve this problem, an approach is needed which singles out from the group of files on a computer only those files that must be analyzed by the network administrator to determine whether to allow or prohibit their execution.

SUMMARY

The present disclosure provides a more effective solution for the problem of application control by means of systems, methods and computer program products for control of applications using preliminary file filtering.

In one aspect, an example method includes intercepting, by a processor, an operation on a file performed by an application; selecting at least a part of the file; applying one or more file filters to the selected part of the file; determining a set of file characteristics based on outcomes of the file filters; determining a decision, based on the set of file characteristics, whether to exclude the file from further analysis by a client of an application control system; and based on the decision, excluding the file from the further analysis by the client of the application control system or providing the file to the client of the application control system for further analysis whether to allow or prohibit the operation on the file.

In another aspect, the method may further include storing the decision and a file identifier of the file in a decision database; retrieving the decision from the decision database based on the file identifier; performing the analysis of the file by the client if the decision indicates not to exclude the file from the analysis by the client or if there is no decision stored in the decision database for the file identifier; and skipping the analysis of the file by the client if the decision indicates to exclude the file from the analysis by the client.

In another aspect, intercepting the operation may be performed by using a driver filter of a file system.

In another aspect, the method may further include prior to applying the file filters to the selected part of the file, retrieving the file filters from a filter database based on the file identifier of the file.

In another aspect, a file filter may include a bit mask that includes a sequence of bits.

In another aspect, applying the file filters to the selected part of the file may include performing an AND operation between the selected part of the file and the bit mask.

In another aspect, the AND operation may be performed on the selected part of the file and starting from an offset, wherein the offset is included in a file filter corresponding to the bit mask.

In another aspect, the method may further include determining a file type of the file based on an outcome of the AND operation.

In another aspect, an example system of application control using file filtering includes a processor configured to intercept an operation on a file performed by an application; select at least a part of the file; apply one or more file filters to the selected part of the file; determine a set of file characteristics based on outcomes of the file filters; determine a decision, based on the set of file characteristics, whether to exclude the file from further analysis by a client of an application control system; and based on the decision, exclude the file from the further analysis by the client of the application control system or provide the file to the client of the application control system for further analysis whether to allow or prohibit the operation on the file.

In another aspect, an example computer program product, stored on a non-transitory computer-readable storage medium, comprises computer-executable instructions for application control using file filtering, including instructions for; intercepting an operation on a file performed by an application; identifying a selected part of the file; applying one or more file filters to the selected part of the file; determining a set of file characteristics based on outcomes of the file filters; determining a decision, based on the set of file characteristics, whether to exclude the file from further analysis by a client of an application control system; and based on the decision, excluding the file from the further analysis by the client of the application control system or providing the file to the client of the application control system for further analysis whether to allow or prohibit the operation on the file.

The above simplified summary of example aspects serves to provide a bask understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for preliminary file filtering for application control. Those of ordinary skill the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

One non-limiting technical result of the present aspects is to reduce the time in which files are analyzed by a client during an application control process, which is accomplished by removing from the file analysis the determination of a set of characteristics that meet the file filtering criteria.

Figure 1:
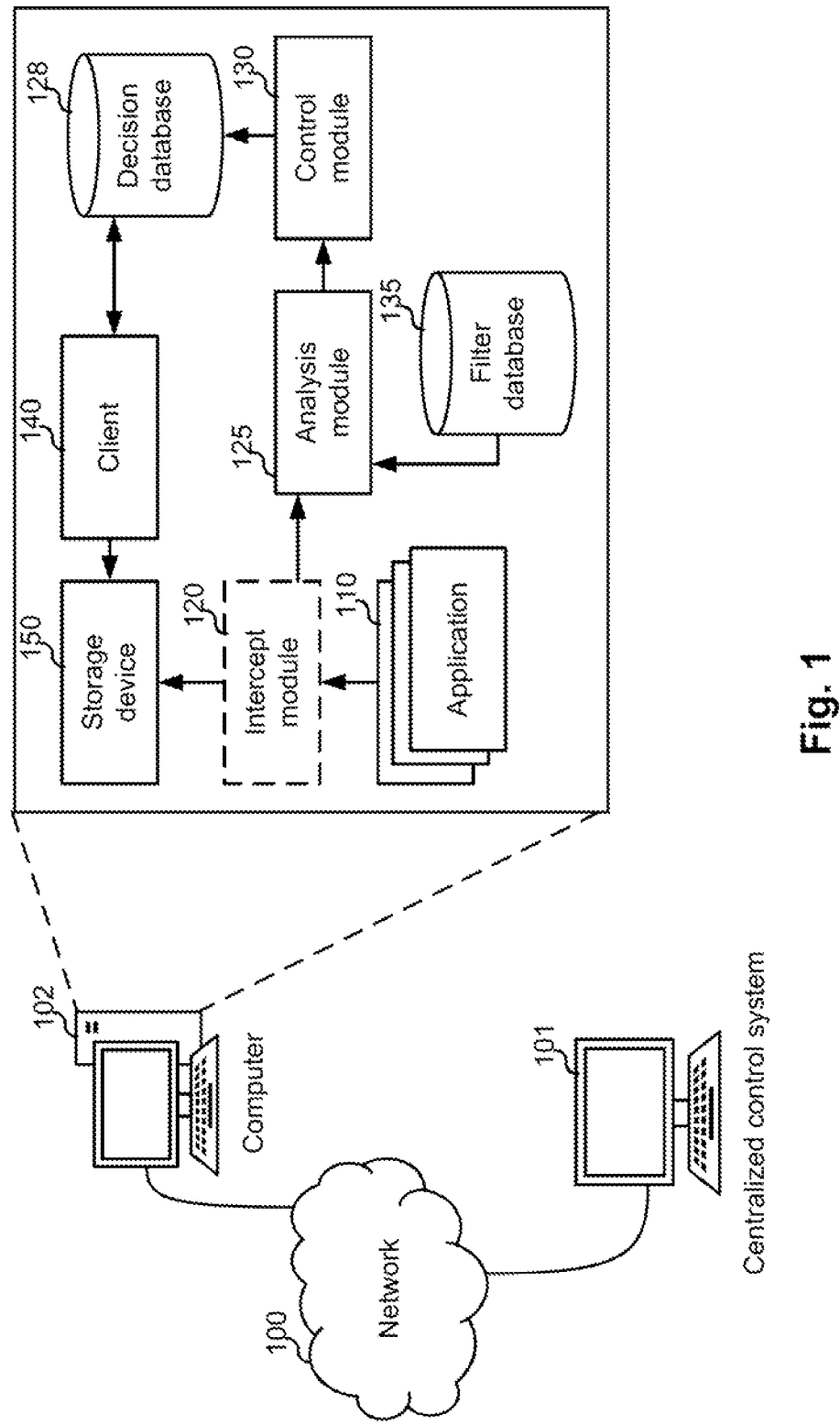
FIG. 1. shows a structural diagram of an example system of preliminary file filtering for application control.

FIG. 1 shows a structural diagram of an example system of preliminary file filtering for application control. In particular, FIG. 1 shows a computer network 100 connecting at least one user computer 102 and at least one centralized control system 101. In one example aspect, both the user computer 102 and the centralized control system 101 include a general-purpose computer system, such as one depicted in FIG. 3. The centralized control system 101 is used by the network administrator of network 100 to check the applications being used within the network 100 (e.g., those applications installed on the user computers 102 connected to the network 100). Together with a client 140 installed on the user computer 102, the centralized control system 101 provides application control: in one example aspect of the present disclosure, with the help of the centralized control system 101, the network administrator of network 100 formulates rules for allowing or prohibiting the launching of applications installed on the user computer 102. In one example aspect, the rule for allowing the launching of applications may be a rule whereby the launching of applications from a given list is allowed on the user computer 102. In one example aspect, the rule for prohibiting the launching of applications may be a rule whereby the launching of applications from a given list is prohibited on the user computer 102. A client 140 installed on the user computer 102 monitors the observance of the rule logic. In one example aspect, the client 140 has access to the formulated lists for prohibiting and/or allowing the launching of applications, and when an application is launched on the user computer 102, the client 140 makes a decision to prohibit and/or allow the launching of that application if it is present on a corresponding list. In one example aspect, the client 140 may control the opening of files (e.g., by a user, for example, during the use of the user computer 102) stored in the storage device 150 of the user computer 102. In another example aspect, the client 140 controls other operations of access to files (such as reading of a file or writing to a file), in one example aspect, the opening of a file may result in the launching of an application if the file is executable, or the launching of an application needed for the opening of the file if the file is a document of, for example, Portable Document Format (PDF) or graphic JPEG type. However, in some aspects, the logic of the rules formulated by the network administrator of network 100 generally regulates the opening of files of a particular type (such as executable files). Thus, in these aspects, there may be a need to filter the opening of files having certain characteristics (especially a file type) from other files. Further, in these aspects, the determining of file characteristics at the moment of opening said file in order to make a decision on excluding the file from further analysis by the client 140 may result in a loss of productivity of the user computer 102 and, consequently, a slowdown of the user working with files in the storage device 150.

However, some present aspects use preliminary filtering to determine the characteristics of files ahead of time, for example, when the file is created (or when the file is modified, where the modifications may affect the file characteristics) in the storage device 150. These aspects may obviate the need to determine the file characteristics each time it is opened. To that end, some present aspects use the intercept module 120 shown in FIG. 1. The intercept module 120 may be used to intercept the operations of writing to a file (including when creating the file and/or when modifying a file already existing in the storage device 150) which are used by at least one application (software) 110 installed on the user computer 102. The application 110 using the operations of writing to a file may be a web browser, such as Microsoft Internet Explorer, or a client of a peer-to-peer network, such as μtorrent. In one example aspect, when using the operating system of the Windows family, the intercept module 120 intercepts calls of the write functions by installing a driver filter of the file system. To that end, some present aspects use a filter manager into which a driver is loaded to carry out the operating logic of the intercept module 120. The intercept module 120 provided by these aspects analyzes requests to write to the memory. To determine the file characteristics during a call for write operations, it may be generally enough to analyze a certain portion of the file, and therefore in one example aspect, the intercept module 120 selects from the flow of file write operations, the write operations (including modification operations) in the beginning region of the file (e.g., the region containing certain data from the beginning of the file). In one example aspect, this region may be 512 bytes in size. The information about the intercepted operations of writing to a file, specifically to the selected part of interest of a file (including the data being written into the beginning region of the file), is sent by the intercept module 120 to the input of an analysis module 125. In one example aspect, the intercept module 120 may additionally send a file identifier (such as the file path or the file's checksum) to the analysis module 125.

In one example aspect, the analysis module 125 may be configured to determine the set of file characteristics by analyzing the part of the file received from the intercept module 120. To determine the set of file characteristics, the analysis module 125 may use a group of file filters, which are stored in a filter database 135. The file filter in one example aspect may be a bit mask, such as the sequence of bits "01001101 01111010", and also at least one characteristic, such as the file type (e.g., the file is an executable or a PDF document). The analysis module 125 uses the file filter (or mask) for the part of the file received from the intercept module 120. In one example aspect, the file filter may also store information on the offset in the part of the file being analyzed, starting from which the file filter should be used. In one example aspect, the use of the file filter may include the calculation of the results of an AND operation applied to the part of the file (including that starting from a particular offset) and a bit mask. If the result of this operation is equal to the value of the bit mask, it is determined that the filter whose mask was used in calculating the AND operation has positively responded in the part of the file. Thus, it is determined that if a certain filter has positively responded in the part of the file, then the file has the characteristic as described in the file filter. In an example aspect, the use of the above-described file filters may help determine the file type.

An example of the determination of a file characteristic is provided as follow. If the mask "01001101 01111010" of a file filter has positively responded at the beginning part of a file, then the file has the characteristic of an "executable file". The characteristic of an "executable file" is present in executable files in the MS-DOS operating system and operating systems of the Windows family. Yet another example is a file filter which responds in files with the characteristic of a "PDF file" (a document file of Portable Document Format type), which is characterized by the mask "00100101 01010000 01000100 01000110". It is also possible to use as a file filter the mask "01000101 01111000 01101001 01100110" with offset 0x6 together with the characteristic which this file filter determines: "JPEG file". In one example aspect, the logic of the filter may be more complex and include a sequence of steps for determining a characteristic. For example, in some aspects, if a file has been recognized as executable in accordance with a file filter (e.g., the file has the characteristic of an "executable file"), then the additional mask "00110010 00101101" is imposed on part of the file after an offset whose value is stored in the same part of the file after the offset 0x3C. If the above-described filter responds, it is determined that the file has the characteristic of a "PE file" (e.g., the file is a PE file in the operating systems of the Windows family). The identified set of file characteristics along with the file identifier are sent by the analysis module 125 to the input of a control module 130.

The control module 130 is configured to make a decision excluding the file from a checking by the client 140 as part of the application control, on the basis of the file characteristics obtained from the analysis module 125. In one example aspect, the control module 130 makes a decision to exclude a file from analysis by the client 140 as part of the application control if the set of file characteristics meets at least one file filtering criterion. In some aspects, for example, a file filtering criterion may be a heuristic rule applied to the set of file characteristics. In one example aspect, examples of file filtering criteria may include the following: exclude a file from analysis if:
the set of file characteristics is empty;
the set of file characteristics includes the characteristic "JPEG file";
the set of file characteristics includes the characteristic "PDF file";
the set of file characteristics includes the characteristic "executable file", but not the characteristic "PE file";
the set of file characteristics does not include the characteristic "executable file".

In accordance with the above-described aspect, the control module 130 may make a decision to exclude or not exclude a file from analysis by the client 140 as part of the application control for each file whose identifier and set of characteristics are obtained by the control module 130 from the analysis module 125. In one example aspect, this decision along with the file identifier for which this decision was made may be sent for storage to a decision database 128. In a particular aspect, the control module 130 may refresh the information already stored in the decision database 128 in accordance with a newly adopted decision.

In one example aspect, before performing the check to determine the access rights to a file (for example, prohibit/allow the opening of the file) in accordance with rules established by the network administrator of network 100, the client 140 sends a request to the decision database 128 indicating the identifier of the particular file in question. If a decision is stored in the decision database 128 on the excluding of the file with the indicated identifier from the analysis by the client 140 as part of the application control, then the client 140 does not analyze this file. But if a decision not to exclude the file from analysis is stored in the decision database 128, or if no decision is stored in the database 128 for the identifier of the file in question, then the client 140 analyzes the file as part of the aforementioned application control process. In another example aspect, the client 140 sends the aforesaid request not to the decision database 128, but to the control module 130, and receives a response in accordance with the above-described logic.

Figure 2:
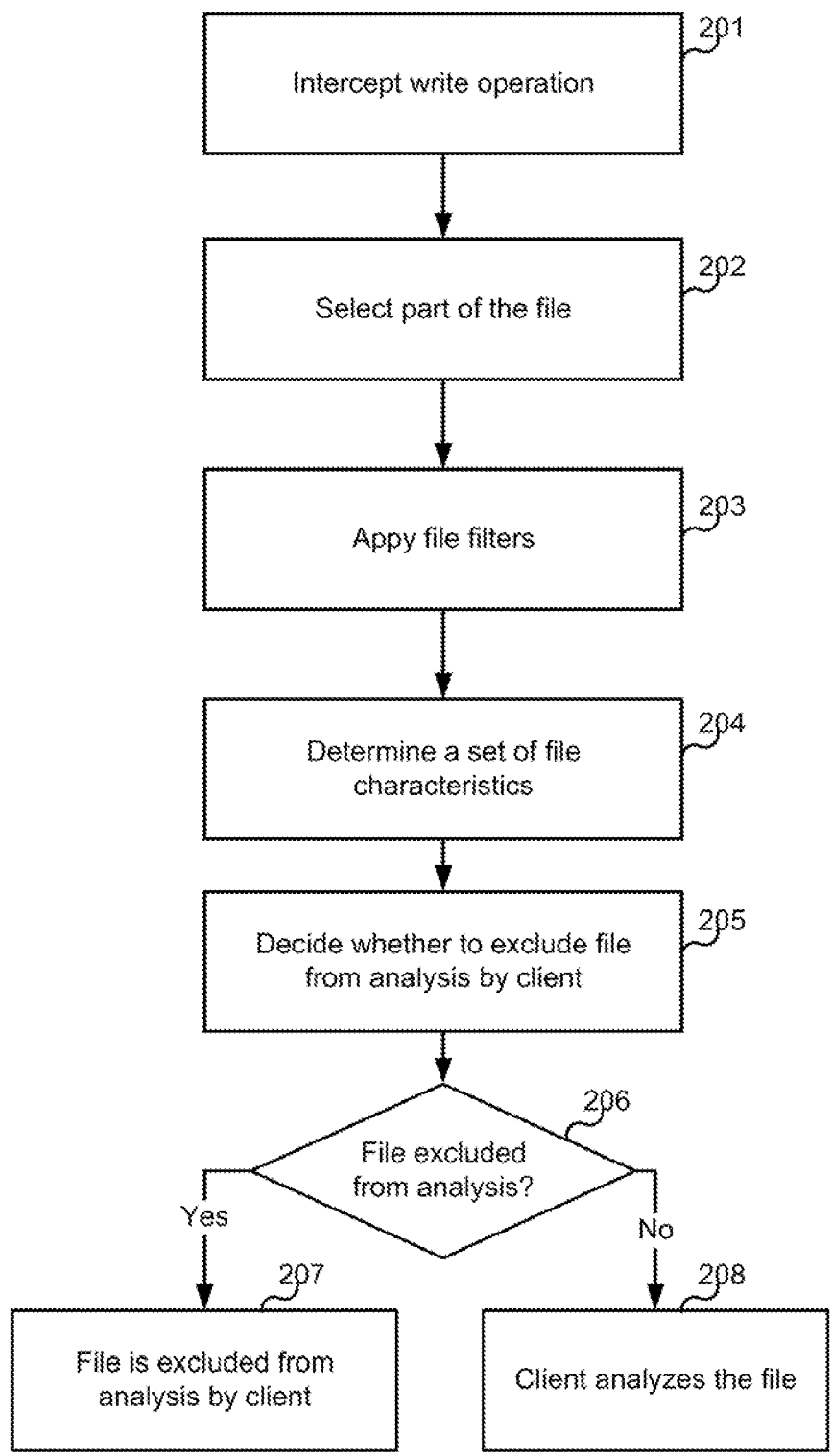
FIG. 2 shows an example flow chart of the operation of one example aspect of a system of preliminary file filtering for application control.

FIG. 2 shows an example flow chart of the operation of one example aspect of the above-described system of preliminary file filtering for application control. In step 201, the intercept module 120 intercepts the operations of writing to a file that are being performed by an application 110, making use of a driver filter of the file system. In step 202, the intercept module 120 selects a part of the file (e.g., beginning 512 bits), which it sends along with a file identifier to the analysis module 125. In step 203, the analysis module 125 applies the file filters included in the filter database 135 to the selected part of the file in order to determine the set of file characteristics in step 204. The obtained set of file characteristics, as well as the file identifier, are sent by the analysis module 125 to the control module 130, which makes a decision whether to exclude the file from analysis by the client 140 based on the set of received file characteristics in step 205. This decision in regard to the file, as well as the file identifier, are sent by the control module 130 to the decision database 128 for storage. The decision to exclude (or not exclude) a file from analysis by the client 140 is retrieved by the client 140 from the decision database 128. If the decision database 128 includes a decision to exclude that file from analysis by the client 140 as part of the application control in step 206, then the client 140 does not analyze said file in step 207. But if the decision database 128 includes a decision to not exclude the file from analysis in step 206, or if the database 128 contains no decision on the file in question, then the client 140 analyzes the file as part of the aforementioned application control process in step 208.

Figure 3:
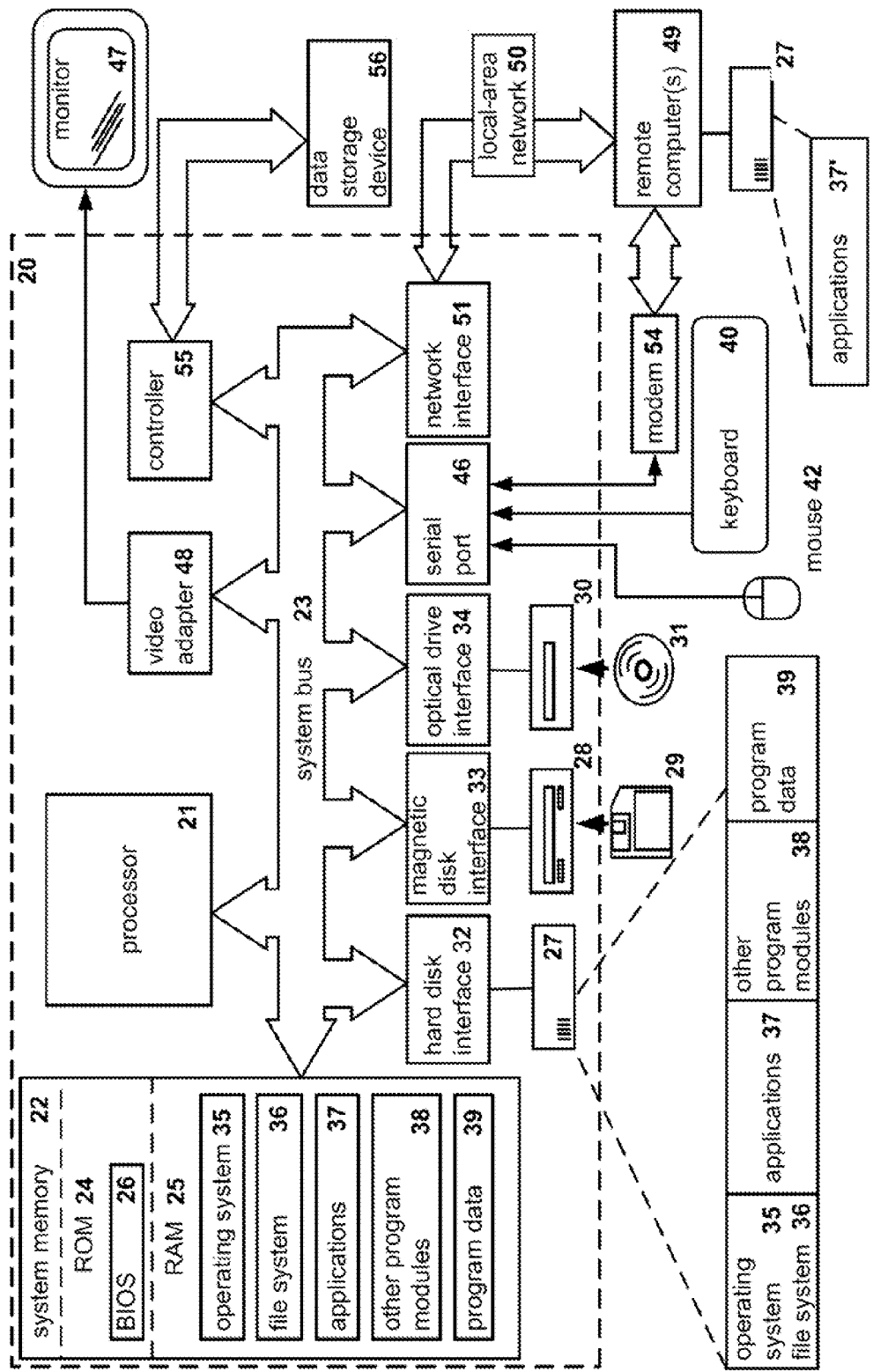
FIG. 3 shows an example of a general-purpose computer system, a personal computer or a server suitable for implementing systems and methods of preliminary file filtering for control of applications.

FIG. 3 shows an example of a general-purpose computer system (which may be a personal computer or a server) 20 suitable for implementing systems and methods of preliminary file filtering for control of applications. The computer system 20 includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The computer system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent means of storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer system 20 has a file system 36, where the recorded operating system 35 is kept, and also additional program applications 37, other program modules 38 and program data 39. The user is able to enter commands and information into the personal computer 20 by means of input devices (keyboard 40, mouse 42). Other input devices (not shown) can be used microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer system 20 is able to work in a network environment, using a network connection to one or more remote computers 49. The remote computer (or computers) 49 are also personal computers or servers having the majority or all of the aforementioned elements in describing the nature of a computer system 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other means of providing communications with a wide-area computer network such as the Internet. The modem 54, which is an internal or external device, is connected to the system bus 23 by means of a serial port 46. It should be noted that the network connections are only examples and need not depict the exact configuration of the network, i.e., in reality there are other ways of establishing a connection of one computer to another by technical communication means.

In various aspects, the systems and methods described herein may be implemented in hardware, software, firmware, or any combination thereof, if implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of application control using file filtering, comprising:

intercepting, by a processor, an operation on a file performed by an application;
selecting at least a part of the file;
applying one or more file filters to the selected part of the file, wherein each of the one or more file filters comprises a bit mask including a sequence of bits;
determining a set of file characteristics based on outcomes of applying the one or more file filters by at least performing an AND operation between the selected part of the file and the bit mask, wherein the AND operation is performed on the selected part of the file and starting from an offset, wherein the offset is included in a file filter corresponding to the bit mask;
determining a decision, based on the set of file characteristics, whether to exclude the file from further analysis by a client of an application control system; and
based on the decision, excluding the file from the further analysis by the client of the application control system or providing the file to the client of the application control system for further analysis whether to allow or prohibit the operation on the file.

2. The method of claim 1, further comprising:
storing the decision and a file identifier of the file in a decision database;
retrieving the decision from the decision database based on the file identifier;
performing the analysis of the file by the client upon detecting that the decision indicates not to exclude the file from the analysis by the client or upon detecting that there is no decision stored in the decision database for the file identifier; and
skipping the analysis of the file by the client upon detecting that the decision indicates to exclude the file from the analysis by the client.

3. The method of claim 1, wherein intercepting the operation on the file is performed by using a driver filter of a file system.

4. The method of claim 1, further comprising:
prior to applying the one or more file filters to the selected part of the file, retrieving each of the one or more file filters from a filter database based on a file identifier of the file.

5. The method of claim 1, further comprising:
determining a file type of the file based on an outcome of the AND operation.

6. A system of application control using file filtering, comprising:
a hardware processor configured to:
intercept an operation on a file performed by an application;
select at least a part of the file;
apply one or more file filters to the selected part of the file, wherein each of the one or more file filters comprises a bit mask including a sequence of bits;
determine a set of file characteristics based on outcomes of applying the one or more file filters by at least performing an AND operation between the selected part of the file and the bit mask, wherein the AND operation is performed on the selected part of the file and starting from an offset, wherein the offset is included in a file filter corresponding to the bit mask;
determine a decision, based on the set of file characteristics, whether to exclude the file from further analysis by a client of an application control system; and
based on the decision, exclude the file from the further analysis by the client of the application control system or provide the file to the client of the application control system for further analysis whether to allow or prohibit the operation on the file.

7. The system of claim 6, wherein the processor is further configured to:
store the decision and a file identifier of the file in a decision database;
retrieve the decision from the decision database based on the file identifier;
perform the analysis of the file by the client upon detecting that the decision indicates not to exclude the file from the analysis by the client or upon detecting that there is no decision stored in the decision database for the file identifier; and
skip the analysis of the file by the client upon detecting that the decision indicates to exclude the file from the analysis by the client.

8. The system of claim 6, wherein the processor is configured to intercept the operation on the file by using a driver filter of a file system.

9. The system of claim 6, wherein the processor is further configured to:
prior to applying the file filters to the selected part of the file, retrieve the one or more file filters from a filter database based on a file identifier of the file.

10. The system of claim 6, wherein the processor is further configured to:
determine a file type of the file based on an outcome of the AND operation.

11. A computer program product stored on a non-transitory computer-readable storage medium, the computer program product comprising computer-executable instructions for application control using file filtering, including instructions for:
intercepting an operation on a file performed by an application;
identifying a selected part of the file;
applying one or more file filters to the selected part of the file, wherein each of the one or more file filters comprises a bit mask including a sequence of bits;
determining a set of file characteristics based on outcomes of applying the one or more file filters by at least performing an AND operation between the selected part of the file and the bit mask, wherein the AND operation is performed on the selected part of the file and starting from an offset, wherein the offset is included in a file filter corresponding to the bit mask;
determining a decision, based on the set of file characteristics, whether to exclude the file from further analysis by a client of an application control system; and
based on the decision, excluding the file from the further analysis by the client of the application control system or providing the file to the client of the application control system for further analysis whether to allow or prohibit the operation on the file.

12. The computer program product of claim 11, further comprising instructions for:
storing the decision and a file identifier of the file in a decision database;
retrieving the decision from the decision database based on the file identifier;
performing the analysis of the file by the client upon detecting that the decision indicates not to exclude the file from the analysis by the client or upon detecting that there is no decision stored in the decision database for the file identifier; and skipping the analysis of the file by the client upon detecting that the decision indicates to exclude the file from the analysis by the client.

13. The computer program product of claim 11, wherein intercepting the operation on the file is performed by using a driver filter of a file system.

14. The computer program product of claim 11, further comprising instructions for:
   prior to applying the file filters to the selected part of the file, retrieving the one or more file filters from a filter database based on a file identifier of the file.

15. The computer program product of claim 11, further comprising instructions for:
   determining a file type of the file based on an outcome of the AND operation.

* * * * *